T. E. MURRAY.
METAL VEHICLE WHEEL.
APPLICATION FILED NOV. 17, 1915.
1,187,542.
Patented June 20, 1916.
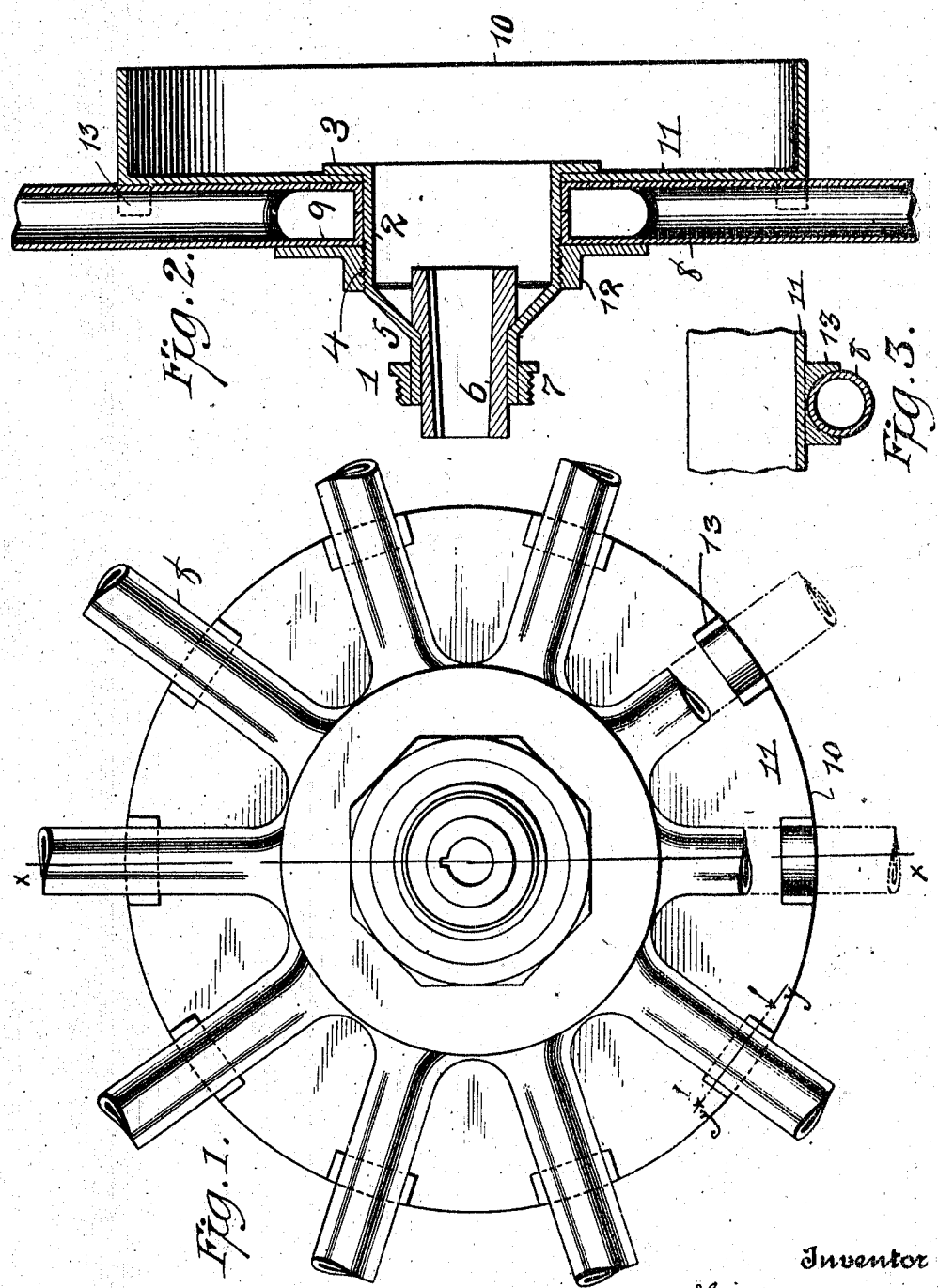
Inventor
Thomas E. Murray
By his Attorney
Park Benjamin

UNITED STATES PATENT OFFICE.

THOMAS E. MURRAY, OF NEW YORK, N. Y.

METAL VEHICLE-WHEEL.

1,187,542.  Specification of Letters Patent.  Patented June 20, 1916.

Application filed November 17, 1915.  Serial No. 61,893.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists more particularly in the construction whereby the wheel is rendered demountable from the hub and whereby the spokes are braced when the wheel is in operating position.

The object is to simplify and cheapen the wheel so as to render it both economical and easy in case of injury to rim or tire to demount the entire wheel and substitute a new one instead of demounting the tire only or the tire and rim together.

In the accompanying drawings Figure 1 is a face view of the hub, brake disk and a portion of the spokes of my wheel. Fig. 2 is a section on the line $x$, $x$, and Fig. 3 is a section on the line $y$, $y$ of Fig. 1.

Similar numbers of reference indicate like parts.

1 is the hub having a cylindrical portion 2 flanged at 3 and threaded at 4. The outer portion of the hub at 5 is contracted and receives the axle tube 6 and a threaded and flanged sleeve 7, to which the axle cap (not shown) is applied.

The wheel body is formed of tubular metal spokes 8, preferably homogeneously united to an annular nave portion 9 which is closed on its inner periphery. Said nave portion 9 fits upon the hub 1. The outer ends of the spokes are connected in any suitable way to the felly, not here shown. The brake disk 10 has in its wall 11 a central opening to receive the cylindrical portion 2 of the hub, and when in place thereon it bears against the flange 3 to which it is to be homogeneously united by electric welding. The wheel nave 9 when in place bears against the brake disk face 11 and is secured by a nut 12 received upon the threaded portion 4 of hub 3. On the face 11 of the brake disk are secured blocks 13 having concavities to receive the spokes. These blocks prevent any rotation of the annular wheel nave 9 upon the hub 3 when the wheel is in use, and also together with the brake disk cause the spokes 8 to become mutually braced.

This construction affords a very simple demountable wheel, since it is only necessary to remove the nut 13 and slide the annular nave 9 outwardly from the hub 3. A new wheel of the same kind can then easily be substituted and the nut 13 replaced.

I claim:

A metal wheel body, comprising a hollow annular nave and tubular spokes united thereto, a cylindrical hub receiving said nave and having a rear flange, a brake disk on said hub interposed between said wheel body and said flange, separate concave blocks secured on the face of said brake disk and receiving said spokes, and means for removably securing said wheel body upon said hub.

In testimony whereof I have affixed my signature in presence of two witnesses.

THOMAS E. MURRAY.

Witnesses:
GERTRUDE T. PORTER,
MAY T. McGARRY.